(No Model.)
W. E. CRANDALL.
HOBBY HORSE.
No. 385,792. Patented July 10, 1888.
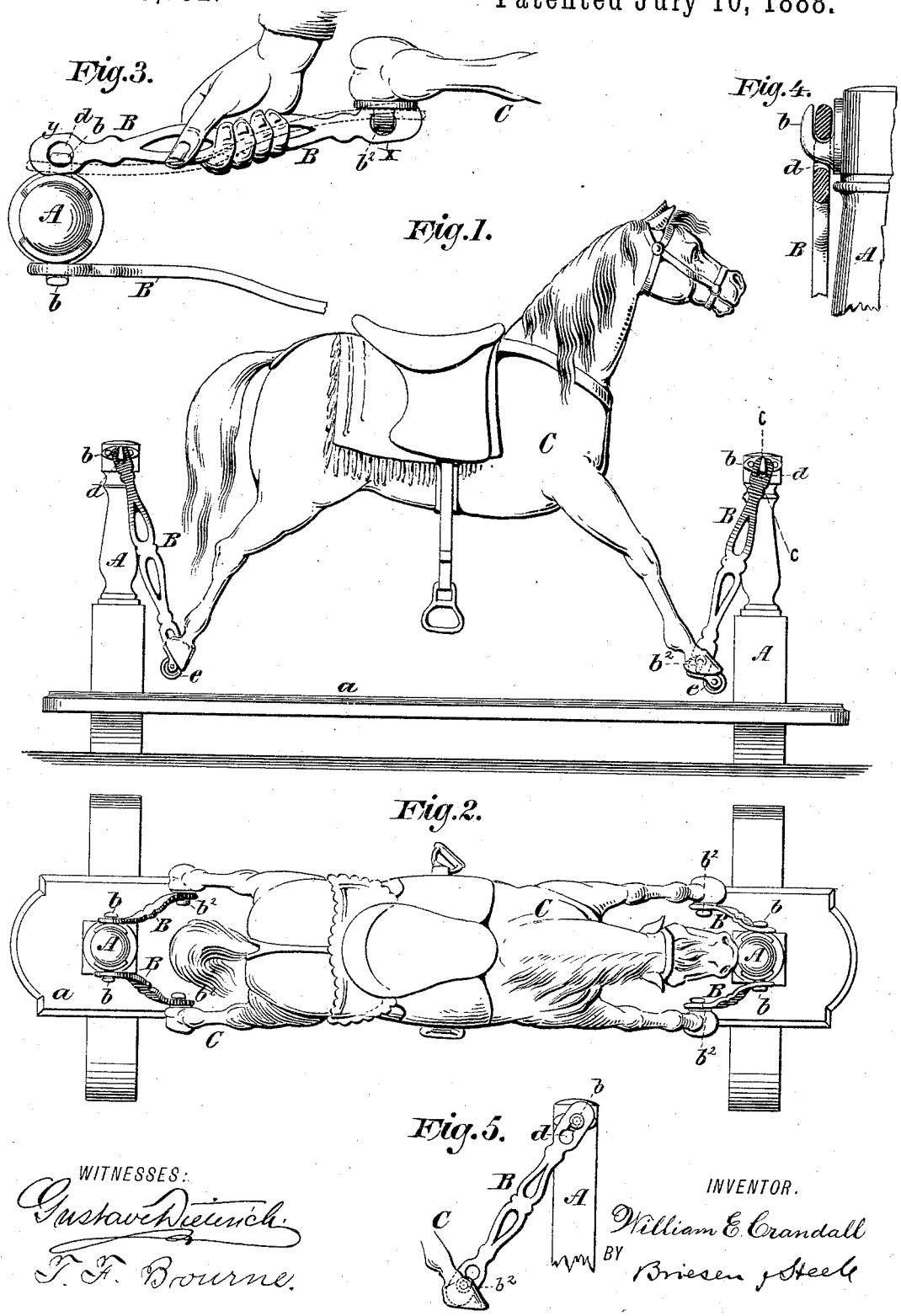
WITNESSES:
Gustave Dieterich
T. F. Bourne
INVENTOR.
William E. Crandall
BY Briesen & Steele
ATTORNEYS
N. PETERS, Photo-Lithographer, Washington, D. C.

UNITED STATES PATENT OFFICE.

WILLIAM E. CRANDALL, OF NEW YORK, N. Y.

HOBBY-HORSE.

SPECIFICATION forming part of Letters Patent No. 385,792, dated July 10, 1888.

Application filed September 28, 1887. Serial No. 250,890. (No model.)

*To all whom it may concern:*

Be it known that I, WILLIAM E. CRANDALL, residing in the city, county, and State of New York, have invented certain new and useful Improvements in Hobby-Horses, of which the following is a specification.

The object of my invention is to provide improved means for suspending a toy horse from posts, whereby it may be readily placed in position and detached from its supports and be securely held when in position.

The invention consists in posts or standards having hooks on each side near their upper ends, combined with a horse having hooks on its feet or legs, and with links or hangers perforated near their ends for convenient connection with and disconnection from said hooks.

The invention also consists in details of construction, as will be more fully hereinafter set forth.

Reference is to be had to the accompanying drawings, forming part of this specification, in which—

Figure 1 is a side elevation of a hobby-horse embodying my improvements. Fig. 2 is a plan view of the same. Fig. 3 is a plan view of a portion of the hobby-horse, showing the position the parts assume when adjusting the supporting-links. Fig. 4 is a partly-sectional view of the upper part of a standard, taken on the line $c$ $c$, Fig. 1. Fig. 5 is a detail view of a modification.

A A represent posts or standards, which may be braced in any suitable manner, preferably by means of the connecting-board $a$.

$b$ $b$ are hooks secured on opposite sides of the posts A A, near their upper ends, and they preferably project upward, as shown in Fig. 4.

B B are links or hangers provided near their upper ends with openings $d$ $d$, which are adapted to engage the hooks $b$ $b$, as shown.

C is a horse-like body of suitable construction, to the feet or legs of which are secured hooks $b^2$ $b^2$, similar in construction to the hooks $b$ $b$. The hooks $b^2$ $b^2$ project downward, or in a direction opposite to that in which the hooks $b$ project, and are adapted to receive the perforated lower ends of the links B B, as hereinafter stated.

$e$ $e$ are casters or rollers secured to the feet of the horse, whereby the horse, when disengaged from the links B and standards A, may be dragged around the floor to vary the amusement.

To suspend the horse from the standards A A by means of the links B B, the feet of the horse must be held, as in Fig. 3, nearly in line with the hooks on the standard. The link B is now placed nearly horizontal, one opening, $d$, being placed over the hook $b$ from above, the opening at the opposite end of the link being then brought up over the hook $b^2$. An outward twist or turn is now given to the link, which will cause the hooks $b$ and $b^2$ to pass through the openings in the link. In like manner each of the links is put on, and it will be seen that no link can be applied or removed unless twisted in manner described on both hooks $b$ and $b^2$ simultaneously. The horse may now be lowered into the position shown in Fig. 1, when it will be suspended from the standards and in a position to be ridden as a rocking or hobby horse. To disconnect the horse from the standards, the feet must first be brought nearly on a line with the hooks $b$ $b$, (see Fig. 3,) when by giving an inward twist to the link it may be carried away from the hooks. By using these links and hooks the horse will be securely held in position without danger of its becoming accidentally disengaged when ridden. Instead of the hooks $b$ $b^2$, headed pins may be used, the openings near the ends of the hooks being made of approximate form—as, for instance, in Fig. 5.

The horse may be readily removed from the standards and rolled about on the rollers $e$ $e$, to afford varied amusement.

To insure a proper understanding of the putting on of the links B, I will further state that the upper part of Fig. 3 shows by full lines a link before it is attached to the hooks, the dotted lines showing it attached. In turning the link from the full-line to the dotted position the edge $x$ is carried over the hook $b^2$ and the edge $y$ is carried under the hook $b$. By reversing the turn thus given to the link it may be disengaged.

Having now described my invention, what I claim is—

1. The combination of the standards A A and hooks $b$ $b$, secured thereto, with the detachable horse C, having hooks $b^2$ $b^2$, and with removable links B B, having perforations for connecting the hooks $b$ and $b^2$, all arranged substantially as herein shown and described.

2. The hobby-horse C, having rollers $e$ and hooks $b^2$, combined with the posts A, having hooks $b$, and detachable perforated links B, for connection with the hooks $b$ $b^2$, all arranged substantially as herein shown and described.

WM. E. CRANDALL.

Witnesses:
HARRY M. TURK,
T. F. BOURNE.